US005117485A

United States Patent [19]

Malachowsky et al.

[11] Patent Number: 5,117,485

[45] Date of Patent: May 26, 1992

[54] METHOD AND APPARATUS FOR SORTING LINE SEGMENTS FOR DISPLAY AND MANIPULATION BY A COMPUTER SYSTEM

[75] Inventors: Chris Malachowsky, Santa Clara; Curtis Priem, Freemont, both of Calif.

[73] Assignee: Sun Microsystems, Inc., Mountain View, Calif.

[21] Appl. No.: 584,496

[22] Filed: Sep. 14, 1990

Related U.S. Application Data

[63] Continuation of Ser. No. 287,392, Dec. 20, 1988, abandoned.

[51] Int. Cl.⁵ .............................................. G06F 15/62

[52] U.S. Cl. ..................................... 395/134; 395/143

[58] Field of Search ........................ 364/518, 521, 522; 340/721, 723, 728, 729, 798-800; 382/44-48

[56] References Cited

U.S. PATENT DOCUMENTS

| | | | |
|---|---|---|---|
| 4,570,181 | 2/1986 | Yamamura | 382/48 X |
| 4,710,767 | 12/1987 | Sciacero et al. | 340/799 |
| 4,829,470 | 9/1989 | Wang | 364/900 |

FOREIGN PATENT DOCUMENTS

| | | |
|---|---|---|
| 0218984 | 4/1987 | European Pat. Off. . |
| 0250868 | 1/1988 | European Pat. Off. . |

*Primary Examiner*—Heather R. Herndon

*Attorney, Agent, or Firm*—Blakely Sokoloff Taylor & Zafman

[57] ABSTRACT

In a computer graphics system in which information defining graphic images to be presented on an output display is available on a scan line basis for a pair of line segments subtending a portion of the an image to be presented. The information includes the slope of each line segment and the addresses of each line segment on each scan line. A circuit comprising two comparator subportions, each of the comparator subportions being adapted to process information regarding one edge of the portion of the image to be presented and including apparatus for receiving first signals representing values of both of the line segments to be procesed for one scan line. Comparing the signals to determine their relative X positions on the scan line, controlling the determination of the relative X positions and the slope of each line segment, and storing one of the signals compared. Receiving second signals representing values of both of the line segments to be processed for the same scan line comparing the second signals to determine their relative X positions on the scan line, and comparing the second signals and the stored one of the signals to select a value for the edge of the particular scan line.

24 Claims, 4 Drawing Sheets

FIGURE 4(a) - (d)

METHOD AND APPARATUS FOR SORTING LINE SEGMENTS FOR DISPLAY AND MANIPULATION BY A COMPUTER SYSTEM

This application is a continuation of U.S. patent application Ser. No. 07/287,392 filed on Dec. 20, 1988, now abandoned.

BACKGROUND OF THE INVENTION

1. Field of the Invention

This invention relates to computer systems and, more particularly, to circuitry for sorting among end points of line segments to be displayed on the output display of a computer system.

2. History of the Prior Art

A major problem in utilizing computers to provide graphic displays is that for a single frame of graphical material to be presented on a cathode ray tube (CRT), it is usually necessary to store an indication of the information which is to be displayed for each position (pixel) of the cathode ray tube. With large and detailed displays, the number of pixels on the cathode ray tube may be approximately one thousand or greater in a horizontal direction and a like number in the vertical direction giving a total of approximately one million or more pixels about which information is to be stored. In a preferred system which is capable of providing a number of different colors on the cathode ray tube, each of these pixels contains eight bits of digital information specifying the particular color output. Consequently, approximately eight million bits of information need to be stored for each frame to be presented at the output.

Not only does color information have to be provided for each pixel for each frame of the display, but in generating graphic displays, the usual method of determining the shapes of figures requires that various algorithms be applied to the data to shape those figures. If this information is handled by the software of the system, computing the positions of each point to be displayed and determining the data to be displayed at that point slows the operation of the system to a point where functions such as animation are essentially impossible. For example, in order to present a polygon on the output display, it is necessary to determine each end on each horizontal line which makes up the polygon because the information is furnished to the display by scan lines. In prior art systems, this determination of the ends of each line to be scanned to the output display required the use of software run by the central processing unit (CPU) to evaluate the end values for each scan line of each graphical shape to be presented. Such arrangements increase the time taken to present the graphics to a point where appreciable slowing of the display occurs.

For this reason, various systems utilizing hardware to speed the operation have been suggested. One method for speeding the operation uses two output frame buffers and loads one buffer while the other is being scanned to the display. Such a system significantly speeds the operation but requires essentially twice as much memory to accomplish the storage.

There has now been proposed a unique system for presenting computer graphics on an output display using only a single output frame buffer. The system breaks all graphics shapes into quadrilaterals, then decomposes the quadrilaterals into subportions subtended by line segments which provide a trapezoidal area of scan lines to be displayed. By breaking the shapes into quadrilaterals, each point, line, triangle, and quadrilateral may be handled in the same manner to speed the operation of the circuit. Moreover, the system allows the information to be scanned to the frame buffer from top to bottom, in reverse, from left to right, or in reverse to further increase the speed of operation because of the ability to eliminate certain page mode jumps and to scan only the information to the frame buffer which need not be clipped thereby eliminating the loss of time in clipping.

Normally, the information to be displayed is transferred to the input of the circuitry for scanning to the frame buffer in a consistent manner. That is, the information transferred first is that which is to be first presented. The information is transferred from the top of the display down and from left to right. This is not the manner in which the system of which the present invention is a part handles the information prior to the time of transfer to the frame buffer. Consequently, some arrangement must be provided for sorting the information available for storage by the frame buffer which arrangement operates to accomplish the sorting without appreciable delay.

It is, therefore, an object of the present invention to speed the operation of computer systems.

It is another object of the present invention to provide circuitry for handling in hardware the manipulations of graphical material which have in the usual case been handled by the software of the computer system.

It is an additional object of the present invention to provide circuitry for sorting among the addressing information provided for storage of images by a frame buffer to determining the X and Y coordinates of the ends of lines to be scanned to the frame buffer for presentation by the output display.

It is an additional object of the present invention to provide circuitry for sorting among the addressing information provided for storage of images by a frame buffer to determining the X and Y coordinates of the ends of lines to be scanned to the frame buffer for presentation by the output display particularly in view of the clip window in which the information is to appear.

SUMMARY OF THE INVENTION

These and other objects of the present invention are realized in a new output display system which utilizes a unique philosophy of graphic figure presentation whereby high speed graphics may be provided using only a single output display buffer.

In order to allow the use of hardware to implement the presentation of graphics, it has been found that the information presented to the hardware will be processed more rapidly if it is of essentially the same nature no matter what the shape is which is to be drawn on the display. The system is based on a definition of a graphical figure (shape) which considers the shape to be composed of a number of subportions each of which are quadrilaterals. Circuitry is provided for rapidly displaying quadrilateral images by handling only information regarding the four vertices of those quadrilaterals. All of these quadrilaterals may be handled in the same manner by the graphics presentation hardware and recombined on the display to present the desired shape.

The system breaks the quadrilaterals into subportions made up of pairs of line segments which subtend a trapezoidal area of scan lines to be presented on the output display. The X and Y coordinates of the two ends of each scan line in each trapezoid are then determined.

The system is devised to select the optimum manner of decomposing a shape so that the operation proceeds at its most rapid. For example, if a shape to be decomposed lies only partially within the clip window and either partially above or below the clip window, the operation will proceed more rapidly if the portion outside the clip window need not be processed. This may be accomplished if the decomposition may proceed from either the top down or the bottom up so that the visible portion of the figure is first presented. Furthermore, if the operation proceeds from the bottom up, fewer page boundaries in memory need to be crossed if the scan line processing proceeds from right to left rather than from left to right as in the normal case. The crossing of fewer page boundaries also allows more rapid operation.

The decomposition provided by the system takes place either from the top down or from the bottom up. The circuitry is also able to determine the start and stop points of each scan line even though the figure is comprised of line segments which cross one another. The ability of the circuitry of this invention to provide such rectilinear coordinates allows the rapid transfers of graphic information to an output display.

However, the ability to proceed in such multiple directions to decompose figures requires circuitry which is able to sort in any order among the information provided in order to present the information in a more logical order to the frame buffer. This invention provides such sorting capability.

The invention comprises a circuit having two portions each of which includes comparator circuitry capable of reviewing addresses defining a pair of line segments. Each portion handles one edge of the subportion defined by the line segments to determine which position of each of those line segments on each scan line is the least or the greatest and which is within a left clip boundary or a right clip boundary. The result of each such determination defines each scan line and is transferred to circuitry for writing to the frame buffer.

These and other objects and features of the invention will become apparent to those skilled in the art by reference to the following detailed description taken together with the several figures of the drawing in which like elements have been referred to by like designations throughout the several views.

NOTATION AND NOMENCLATURE

Figure 1:
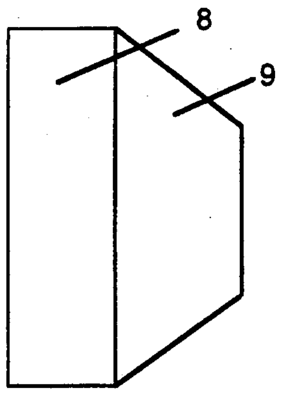
FIG. 1 is a representation of a graphical shape divided into two quadrilaterals which when individually displayed on a computer output device provide the complete original shape.
Figure 2A:
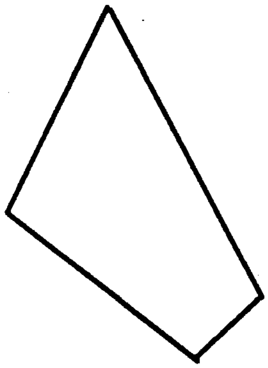
FIGS. 2(*a*)-(*d*) is an illustration of a single quadrilateral shape decomposed into line segments.
Figure 2C:
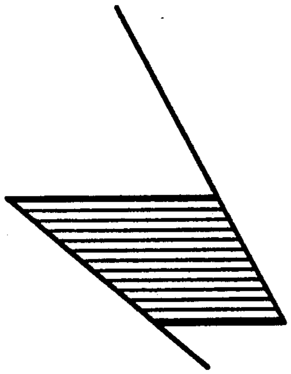
Figure 2B:
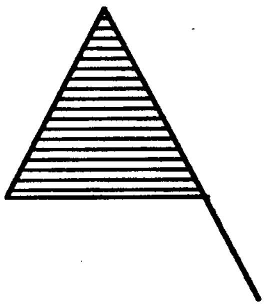
Figure 2D:
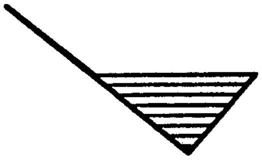

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method of operations in operating a computer and the method of computation itself should be borne in mind. The present invention relates to method steps for operating a computer in processing electrical or other (e.g. mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DESCRIPTION OF THE PREFERRED EMBODIMENT

In designing computer systems, it has become apparent that the display of graphic images substantially slows the operation of most machines. This occurs because the amount of information that the computer must deal with for each frame to be presented on the output display is very large and because the manipulation of that information in order to present the graphics image requires inordinate use of the central processing unit (CPU).

This is especially true in a system which utilizes an interface including multiple "windows" for its output display. In such a system, more than one program at a time is placed in portions of memory which are available for instant call. The text and graphics output of each such program is made to appear on the output display in a particular set of defined boundaries called a window or a clip window. Each window may overlap other windows with the "front window" constituting the current work file. Usually, the computer operator manipulates the program in only one window at a time but may switch rapidly to a program in another window to work with that program. In general, windows require substantially more memory and time to manipulate than do non-window operations.

The system of which this invention is a part speeds the display of computer graphics by handling most of the operations in hardware so that the information is available instantaneously. In order to allow the use of hardware to implement the presentation of graphics, the system breaks the graphics images to be presented on the display into quadrilaterals all of which may be handled in the same manner by the hardware. The system takes these quadrilaterals and further breaks them into line segments which subtend the same scan lines to be presented on the output display, the scan lines forming, in effect, a trapezoid. The X and Y coordinates of the two ends of each scan line are then determined by the circuitry of this invention. The system takes those rectilinear coordinates and translates them into serial scan lines which may be stored in a frame buffer and displayed on an output display.

FIG. 1 is a representation of a graphical shape divided into two quadrilaterals 8 and 9 which when individually displayed on a computer output device provide the complete original shape. Although the shape shown in FIG. 1 is simple, it will be apparent to those skilled in the art that shapes of essentially infinite complication may be represented if a sufficiently large number of small individual quadrilaterals are chosen. In fact, the system of the present invention has been utilized to represent three dimensional animated shapes of a very complicated nature.

Figure 3:
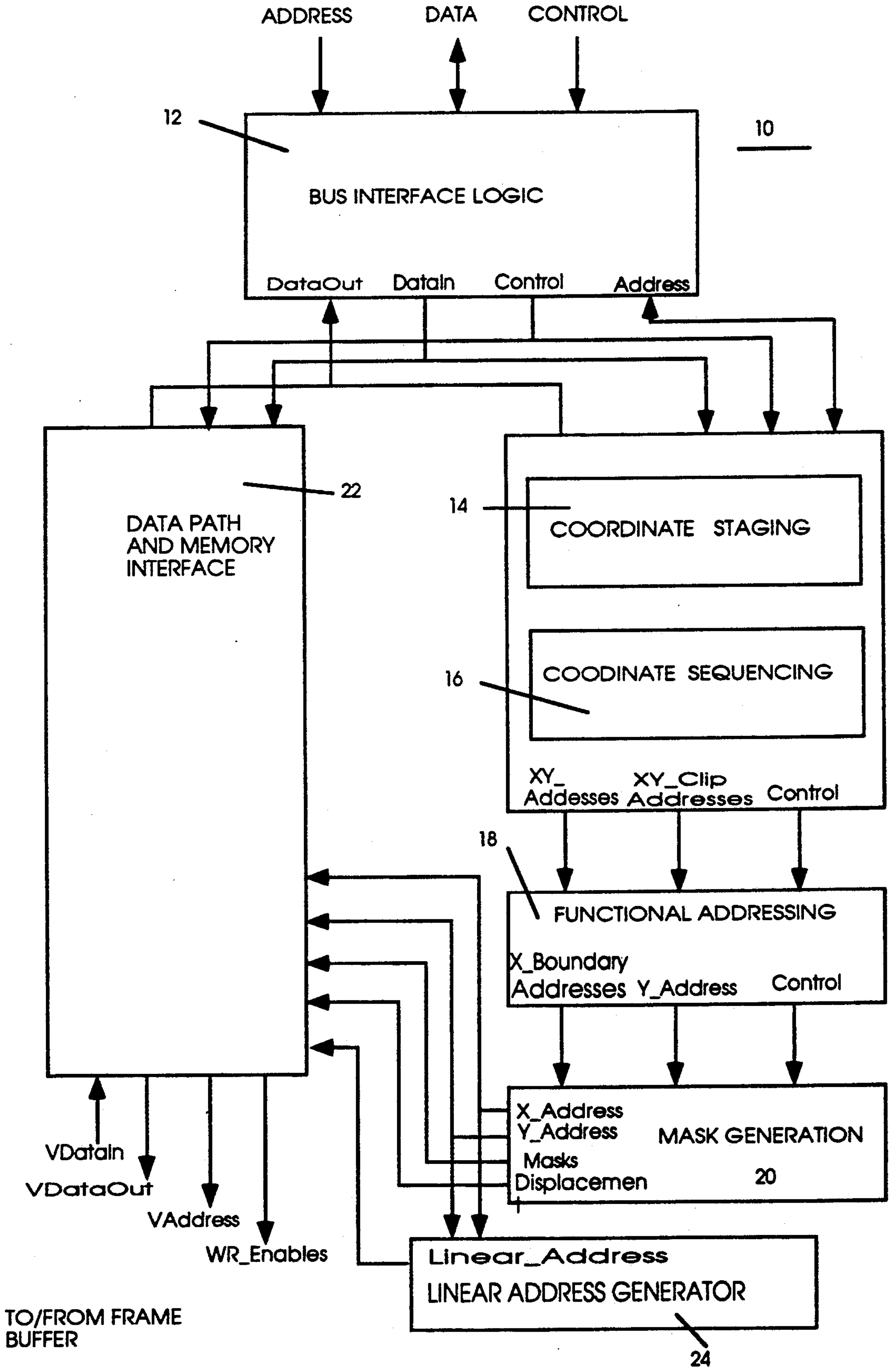
FIG. 3 is a block diagram illustrating a graphical output system for a computer constructed in accordance with the invention.

FIG. 3 illustrates in block diagram form a graphical output system 10 constructed in accordance with the invention which may be used with a general purpose computer system. The system 10 includes bus interface logic 12 which receives information regarding the desired graphical shape from the central processing unit of the computer system (not shown in the figures). The bus interface logic 12 receives information on an address line which designates the particular portion of the system 10 to which the input is to be transferred. The bus interface logic 12 receives the actual data such as the color description on an input data line. The bus interface logic 12 also receives a control signal designating the manner in which the information is to be treated on a control line.

When constructing graphical representations from quadrilaterals in accordance with the present invention, the input information includes the coordinates of the particular window in which the information is to appear, the coordinates (vertices) of the quadrilateral, and the color data regarding each quadrilateral. The color data which is to be presented at the display of the quadrilateral is stored in a data path and memory interface stage 22. The vertices of the quadrilateral and the clip window information are stored in coordinate staging circuitry 14 which includes hardware that provides comparisons of the incoming information by means well known to the prior art such as registers and gating circuits.

The comparisons made include the comparison of each X value of each vertex to the X value of each of the other vertices, the comparison of each Y value of each vertex to the Y value of each of the other vertices, and the comparison of each of the X and Y values of the vertices to the X and Y values of the edges of the clip window in which the information is the be presented. Since this is accomplished by hardware, the information is immediately available for use by the system 10 without loss of any system clock time.

The information regarding the vertices of the quadrilateral and the clip window available at the coordinate staging circuitry 14 is presented to a coordinate sequencing stage 16 at which the quadrilateral is decomposed into a series of subportions each of which comprise two line segments of the original quadrilateral. Each of these subportions is chosen such that the line segments define an area of the quadrilateral which may be drawn by a series of parallel horizontal scan lines, each having an X beginning value lying on one of the line segments and an X ending value lying on the other. In essence, the two line segments subtend a trapezoidal area including as many Y (horizontal) scan lines as is as possible in view of the shape of the quadrilateral. When all of the scan lines of all of the subportions are rendered on the display, the quadrilateral is defined in total.

FIGS. 2(*a*)-(*d*) illustrates a single quadrilateral divided into subportions by the system including this invention. The quadrilateral which is decomposed is shown in FIG. 2(*a*), and the subportions thereof are illustrated in FIGS. 2(*b*)-(*d*). As may be seen in FIG. 2, each subportion includes, when presented on an output display, a series of horizontal scan lines which begin at one line segment defining the quadrilateral and end at another line segment. The scan lines for each subportion of the quadrilateral represent a trapezoidal portion (or degenerate trapezoidal portion) of the original quadrilateral. When these horizontal lines of all of the trapezoidal subportions are scanned to the frame buffer for presentation on the output display, the entire quadrilateral shape is reconstituted on the display.

Referring again to FIG. 3, after the quadrilaterals have been decomposed into subportions, the individual Y scan lines have their beginning and ending X values determined at a functional addressing stage 18. In the preferred embodiment of the invention, this is accomplished by the use of circuitry which determines the particular pixels constituting the X values at the beginning and end of each scan line within the decomposed subportions of the quadrilateral. This functional addressing stage 18 also accomplishes a portion of the clipping necessary to fit the particular quadrilaterals to the clip windows, and then transfers the signals to a mask generation state 20 which arranges the information into sixteen bit portions that designate the beginning and end of each scan line and are used for addressing the data path and memory interface stage 22.

The mask generation signals are also furnished to a linear address generator 24 which translates the rectilinear addresses provided by the mask generation stage 20 into signals for linearly addressing the frame buffer for the output display. At this point, the color data relating to the quadrilateral to be displayed which has been held in memory at the stage 22 is transferred to the output display (frame) buffer.

Various portions of the system above described are more particularly described in the following patent applications, all of which were filed on the filling date of this patent application and are assigned to the assignee hereof: Ser. No. 07/297,475, filed Jan. 13, 1989, HARDWARE IMPLEMENTATION OF CLIP- PING AND INTER-COORDINATE COMPARISON LOGIC, Malachowsky and Priem; Ser. No. 07/297,604, filed Jan. 13, 1989, APPARATUS AND METHOD FOR PROCESSING GRAPHICAL INFORMATION TO MINIMIZE PAGE CROSSINGS AND ELIMINATE PROCESSING OF INFORMATION OUTSIDE A PREDETERMINED CLIP, Malachowsky and Priem; Ser. No. 07/297,093, filed Jan. 13, 1989, APPARATUS AND METHOD FOR USING A TEST WINDOW IN A GRAPHICS SUBSYSTEM WHICH INCORPORATE HARDWARE TO PERFORM CLIPPING OF IMAGES, Malachowsky and Priem; Ser. No. 07/297,590, filed Jan. 13, 1989, APPARATUS AND METHOD FOR LOADING COORDINATE REGISTERS FOR USE WITH A GRAPHICS SUBSYSTEM UTILIZING AN INDEX REGISTER, Malachowsky and Priem; U.S. Pat. No. 4,945,497 issued Jul. 31, 1990, METHOD AND APPARATUS FOR TRANSLATING RECTILINEAR INFORMATION INTO SCAN LINE INFORMATION FOR DISPLAY BY A COMPUTER SYSTEM, Malachowsky and Priem; Ser. No. 07/286,997, filed Dec. 20, 1988, METHOD AND APPARATUS FOR DETERMINING LINE POSITIONS FOR DISPLAY AND MANIPULATION BY A COMPUTER SYSTEM, Malachowsky and Priem; and Ser. No. 07/287,128, filed Dec. 20, 1988, METHOD AND APPARATUS FOR DECOMPOSING A QUADRILATERAL FIGURE FOR DISPLAY AND MANIPULATION BY A COMPUTER SYSTEM, C. Malachowsky.

The invention considered by this specification relates to the apparatus and method for sorting the end points of the various line segments which make up the horizontal scan lines in each trapezoidal subportion of the quadrilateral to determine which are ultimately to be provided to the output display as scan lines and in what order. Such sorting circuitry is necessary, first, because the system is able to decompose the quadrilaterals in any direction in order to speed the presentation of the graphic output; moreover, the circuitry does not put restrictions on the edges of the trapezoidal areas formed by the pair of line segments in terms of slope, relationship to each other, or whether they may intersect one another. Although this invention is described in terms of the graphics system illustrated in FIG. 3, it will be realized by those skilled in the art that it will have broad application in other systems for providing graphical output displays for computer systems.

The circuitry of this invention receives address information representing the end points of each of the scan lines making up each of the trapezoidal areas to be presented on the output display. The circuitry which provides these signals is described in copending U.S. patent application Ser. No. 07/286,997, entitled METHOD AND APPARATUS FOR DETERMINING LINE POSITIONS FOR DISPLAY AND MANIPULATION, Malachowsky and Priem, filed on even date herewith.

When drawing a straight line on an output display such as a cathode ray tube, the line is defined by a series of pixels on adjacent scan lines. If the line to be drawn is horizontal, then a single scan line on the display is sufficient to draw the line if the address of the starting and ending pixels are furnished. If the line is vertical, then a single pixel from each of a number of adjacent scan lines must be written to the display. Lines between vertical and horizontal vary in the number of pixels per scan line depending on the slope of the lines. If the line has a small slope, then a number of adjacent pixels are drawn on each of a number of adjacent scan lines, continuing until the line is completed. If the beginning and ending X values of each series of adjacent pixels on each scan line are known, then the intervening pixels may be filled on the display and the line completed.

It is necessary to know the position on each scan line of each of the line segments which define the sides of the trapezoids to be scanned to the display in order to draw those trapezoids. This is true in order to begin and end each scan line and to clip the scan lines to fit a clip window. If clipping occurs across a line segment, a method must be devised for determining the portion of each line segment which to be drawn. The circuitry of this invention receives the individual beginnings and endings of the scan lines, selects among them to determine the appropriate ones for presentation on the display, applies right and left clip window edges to the lines, and ultimately determines the specific scan lines to be stored in the frame buffer for presentation by the output display.

Figure 4:
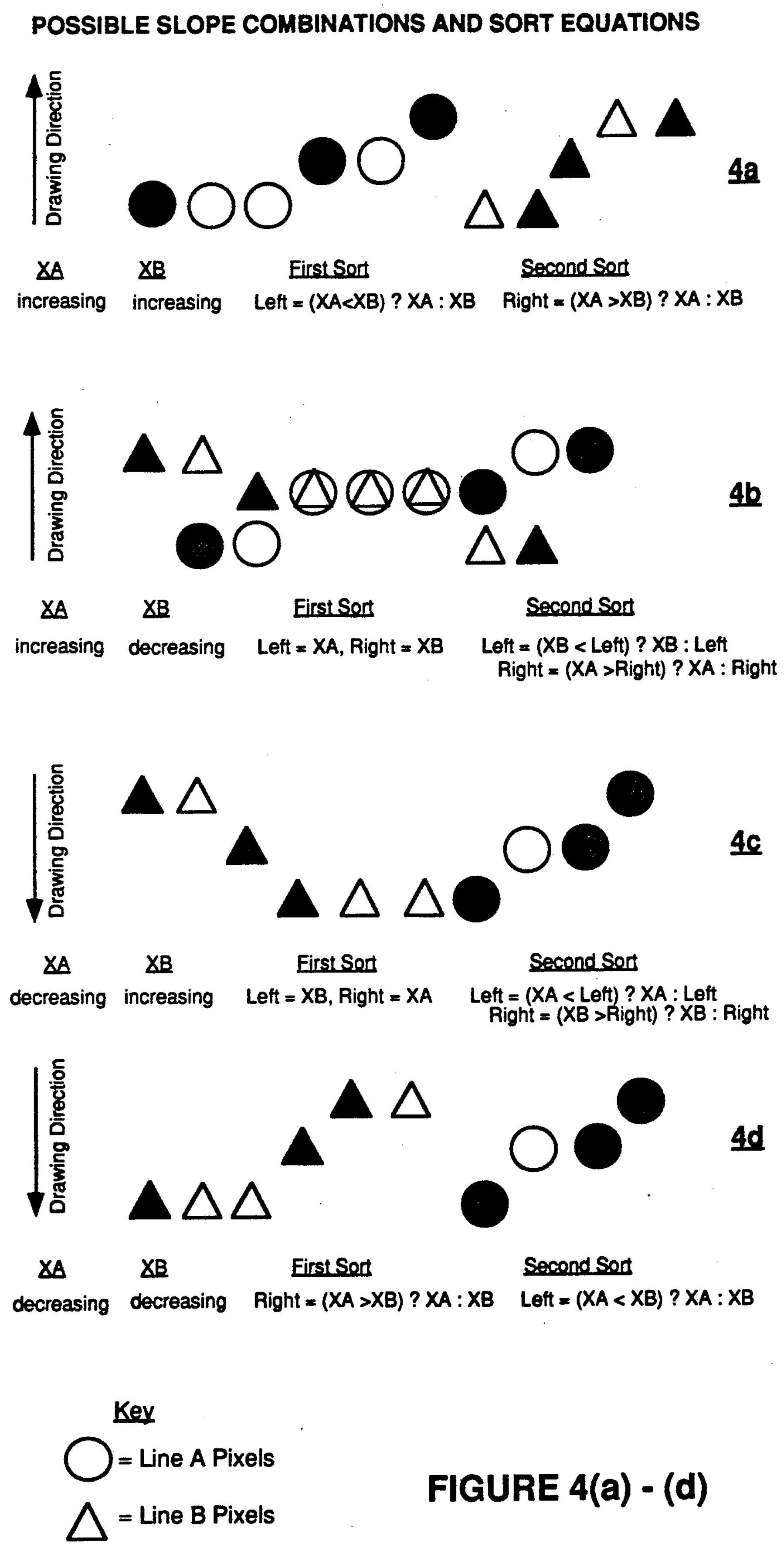
FIGS. 4(*a*)-(*d*) are illustrations useful in explaining the operation of the invention.

FIGS. 4(*a*)–(*d*) illustrates the operation of the circuit of this invention. The information which is presented to the circuitry includes the X values of pixels encountered on a given scan line during the processing of the two individual line segments. The individual line segments subtend the trapezoidal subportions of the quadrilaterals which are to be provided to the frame buffer. The pixels encountered for a given line segment may contain one or more pixels, one or two of which may ultimately define one or both ends of the scan line to be displayed at the output. The circuitry of this invention selects from among the clip window boundaries and the pixels encountered on each scan line which of the individual pixels is to form each end of the scan line. With two ends determined, the scan line may be drawn to join the two. This function is accomplished by circuitry of the mask generation logic 20 of FIG. 3.

Each of the line segments to be handled by the circuitry may be increasing or decreasing in value as the line is to be drawn on the output display as previously mentioned. The direction in which the shape is to be rendered on the output display is shown to the left of each of the shapes in FIG. 4. The circuitry handles the two line segments in four distinct ways depending on whether both line segments have increasing X values, both have decreasing X values, the first is increasing and the second decreasing, or the first is decreasing and the second increasing.

In the case shown in FIG. 4(*a*), the direction in which the shape is being drawn is from the bottom up. Both the line segments are increasing in X values. The lower horizontal pixels are thus presented to the circuitry first. As shown in the figure, line segment A has its pixels described by circles; line segment B has its pixels described by triangles. In this case the circuitry is presented the pixels of both line segments with the leftmost pixel of each line segment being presented first for each line. The two leftmost pixels of each line segment are received at the same time, these are compared, and the least (leftmost) is stored as the leftmost pixel of the scan line. The operation proceeds until it is time to change Y. The last pixel in both line segments A and B is the rightmost of each. These are compared and the greatest is stored as the rightmost boundary. For this scan line, the leftmost pixel, the rightmost pixel, and the Y values are thus known so the line to be scanned to the frame buffer is completely defined.

The next pixels presented are those at the next Y value. Again the first pixels received by the circuitry are the leftmost pixels of line A and line B. These are compared and the leftmost stored as the leftmost pixel of this scan line. The operation continues defining X values; and, in accordance with the operation of the remainder of the system, the circuitry generating the line segment values causes the generation of signals for line B to halt and wait for line A to reach the Y change stage. When line A reaches this stage, the two rightmost pixels are compared; and the rightmost pixel of the two is stored as the rightmost pixel of the scan line. Thus, this scan line is also completely defined.

In the case illustrated in FIG. 4(*b*), the slope of line A is increasing and of line B is decreasing so that the first pixel presented on line A is the leftmost, while for line B, the first pixel is the rightmost. In this case, the first line A pixel is stored as the leftmost pixel, and the first pixel of the B line is stored as the rightmost pixel of the scan line. The operation proceeds until the end pixels of each of lines A and B are encountered. The rightmost pixel of the A line is compared to the rightmost boundary pixel previously stored; and the rightmost of these is stored as the rightmost boundary of the scan line. The leftmost pixel of the B line is compared to the previously stored leftmost pixel, and the least of these is stored as the leftmost boundary of the scan line. In the case shown in FIG. 4(*b*), the original values stored for the leftmost and rightmost pixels remain the values for the scan line.

On the next scan line, the initial pixels for lines A and B are again stored as the leftmost and rightmost pixels of the scan line, respectively. Then the operation proceeds to define the remaining X positions of the scan line until the last pixel of each of lines A and B is encountered. Again, the last pixel of the A line is compared with the value stored as the rightmost pixel; and the higher value stored as the rightmost pixel. In the case shown in FIG. 4(*b*), the A value is greater and replaces the previously stored rightmost value. At the same time, thee last B line pixel is compared to the value stored as the leftmost pixel for the scan line; and the least value is stored as the leftmost pixel for the scan line. The operation proceeds in the same manner to complete the particular trapezoidal shape.

In FIG. 4(*c*), the slope of line A is decreasing and that of line B is increasing so that the first pixel presented on line A is the rightmost while on line B it is the leftmost. In this case, the first line A pixel is stored as the rightmost pixel and the first pixel of the B line is stored as the leftmost pixel of the scan line. The operation proceeds until the end pixels of each line A and B are encountered. The leftmost pixel of the A line is then compared to the leftmost boundary previously stored; and the leftmost of these is stored as the leftmost boundary of the scan line. The rightmost pixel of the B line is compared to the previously stored rightmost pixel and the least of these is stored as the rightmost boundary of the scan line. In the case shown in FIG. 4(*c*), the original values stored for the leftmost and rightmost pixels remain the values for the scan line.

On the next scan line, the initial pixels for lines A and B are stored as the rightmost and leftmost pixels of the scan line, respectively. Then, the operation proceeds to define the remaining X positions of each line until the last pixel of each of lines A and B is encountered. Again, the last pixel of the A line is compared with the value stored as the leftmost pixel and the least value stored as the leftmost pixel. In the case shown in FIG. 4(*c*), the previously stored value is greater and remains the rightmost value. At the same time, the last B line pixel is compared to the value stored as the rightmost pixel for the scan line, and the greater value stored as the rightmost pixel for the scan line. The operation proceeds in the same manner to complete the particular trapezoidal shape.

The final case of FIG. 4(*d*) is essentially the reverse of that shown in FIG. 4(*a*) in that both lines have decreasing slopes. In this case the circuitry is presented the pixels of both line segments with the rightmost being presented first for each line. The two rightmost pixels are received at the same time, these are compared, and the greater (rightmost) is stored as the rightmost pixel. The operation proceeds until it is time to change Y. The last pixel in both lines A and B is the leftmost of each. These are compared and the least is stored as the leftmost boundary. For this scan line, the leftmost pixel, the rightmost pixel, and the Y values are thus known so the line is completely defined to be scanned to the frame buffer.

The next pixels presented are those at the next Y value. Again the first pixels received by the circuitry are the rightmost pixels of line A and line B. These are compared and the rightmost stored are the rightmost pixel of this scan line. On the last pixel of each line, the two leftmost pixels of the scan line. Thus, this scan line is also completely defined. The operation continues until the trapezoid is completely defined.

Figure 5:
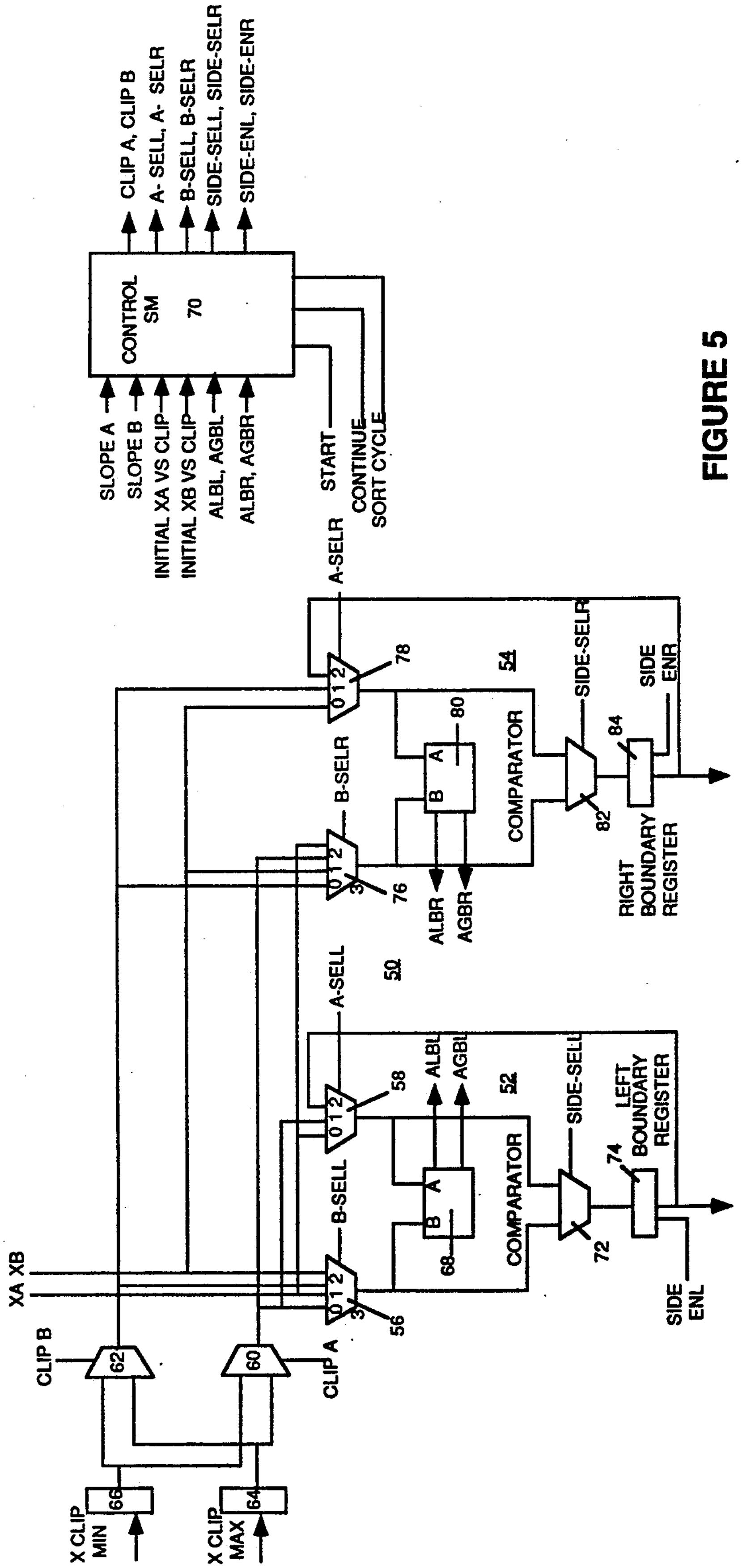
FIG. 5 is a circuit diagram illustrating one arrangement for implementing the invention.

FIG. 5 illustrates a preferred embodiment of a circuit 50 for implementing the invention. The circuit 50 includes left side comparator circuit 52 and right side comparator circuit 54. The comparator circuits 52 and 54 process the values for making the comparisons for the left and right sides of each of the scan lines as described above.

The left side circuit 52 receives input signals through a pair of mulitplexers 56 and 58. The multiplexers 56 and 58 receive input signals representing the X values of the A and B line segments. The multiplexers 56 and 58 also receive input signals representing the X values of the clip window in which the signals are to appear; these are designated ClipXA and ClipXB and are furnished by a pair of multiplexers 60 and 62 each of which receives both clip values from a pair of registers 64 and 66.

The signals provided by the multiplexers 56 and 58 are furnished to a magnitude comparator 68 which provides output signals to a state machine 70 indicating the results of the comparison. The state machine 70 uses these results and its other inputs to control a multiplexer 72 to allow the transfer of signals to a register 74 which stores the left boundary value.

The comparator circuit 54 has a similar arrangement including a pair of multiplexers 76 and 78, a comparator 80, a multiplexer 82, and a boundary register 84.

The circuitry of the invention accomplishes this sorting even though the pixels defining the individual line segments are presented from the top of the screen down or from the bottom of the screen up, whether from left to right or from right to left.

In general, the operation of the circuit 50 is as follows. An operation is initiated when the state machine 70 receives a start signal from the external control logic. During the entire operation, the registers 64 and 66 contain the X values of the clip window in which the information is to be written. Moreover, the state machine 70 initially receives information from previous portions of the circuitry regarding the comparisons of the clip window boundaries to the end of the two line segments A and B and the slopes of the two line segments. The state machine 70 controls the operation of the multiplexers of the circuit 50 and the timing of operations. The operation of the circuit 50 takes place on a per scan line basis.

Presuming for the following discussion that the clip window is not a factor, then the first pixels on the scan line for the A and B lines are presented on the input lines Xa and Xb to the multiplexers 56, 58, 76, and 78. The state machine selects on the Asel and Bsel lines the signal to be transferred by the particular multiplexer. Assuming for example that the case illustrated in FIG. 4(*a*) is being processed, the state machine has inputs indicating that the slopes of both line segments A and B are increasing and that the first pixels of each line segment are to be compared and the least value stored. The state machine 70, therefore, provides signals transferring the Xa input signal on line 0 of multiplexer 58 and the Xb input signal on line 3 of multiplexer 56. These signals are compared by comparator 68, and a signal indicating which is least is sent to the state machine 70. The machine 70 then enables the multiplexer 72 to select the least value, that occurring on the line from multiplexer 58, and transfer the value to the register 74 which stores the left boundary indication. At this point in the process, the right boundary register 84 is uninitialized.

When the state machine receives a signal indicating that a change in the scan line (a change in Y value) is to occur, the multiplexers 76 and 78 receive the last input values Xa and Xb and transfer those values to the comparator 80 where the determination that Xb is larger than Xa is made and sent to the state machine 70. This causes the state machine 70 to enable the multiplexer 82 to transfer the greater value to the right boundary register 84.

In this manner, the values necessary to describe the first scan line of the case of FIG. 4(*a*) are determined. The remainder of the area to be described between the line segments A and B is determined in the same manner with the circuit 52 determining and storing the least X value and the circuit 54 determining and storing the greatest X value which are necessary to describe the scan line.

In the case illustrated in FIG. 4(*b*), presuming no clipping, the first signal Xa at terminal 0 of the multiplexer 58 and transferred by the multiplexer 72 to storage by the left boundary register 74. In like manner, since the line segment has a decreasing slope, the first Xb value to be encountered is the rightmost in the illustration; this is transferred via the multiplexers 76 and 82 to storage in the right boundary register 84. As the last pixel on the scan line is reached, the Xb value is transferred by the multiplexer 56 and compared to the value stored in the left boundary register 74 (furnished at terminal 2 of the multiplexer 58) in the comparator 68. Since the value already stored is the lesser, it is retained in the register 74. The last Xa value is transferred by the multiplexer 76 and compared to the value stored in the right boundary register 84 (furnished at terminal 2 of the multiplexer 78) in the comparator 80. Since the value already stored is greater, it is retained in the register 84.

On the next scan line, the same operation takes place. The first Xa value and the first Xb values are stored in the leftmost and rightmost registers, respectively. When the end of the scan line is reached and it is time to transfer to the next scan line, the last Xb value is compared to the value stored in the left boundary register 74, the Xb value being the lesser is stored as the left boundary value. The last Xa value is compared to the value in right boundary register 84 and, being greater, replaces the value in the right boundary register 84.

As the end of each scan line is reached, the values in the registers 74 and 84 are transferred to the masking circuitry 20 illustrated in FIG. 3 for transfer to the frame buffer and display at the output display.

As pointed out above, any operation begins upon a start signal being received by the state machine 70. At that time, the two registers 64 and 66 contain the X values of the right and left edges of the clip window. The state machine 70 keeps track of the appropriate clip window edges to compare against Xa and Xb to check for visibility and sends a signal to the multiplexers 60 and 62 to indicate whether the A and B values should be compared against the left or right side of the clip window.

In the default condition of the state machine 70, that is, when the machine 70 is not otherwise controlling the operation of the circuit 50 for actual left or right boundary determinations, the default values appearing on the 0 lines to the multiplexers 56, 58, 76, and 78 are passed by those multiplexers and compared by the 68 and 80. In this manner, the Xa value is compared to the ClipXa clip window value and Xb is compared to the ClipXb clip window value. This comparison is passed to the state machine 70 which remembers this for later use. If it is determined that Xa, for instance, is outside the clip window, then when a boundary determination cycle occurs, the value of ClipXa is passed through the appropriate multiplexer (56, 58, 76, or 78) instead of Xa whenever Xa is logically required to be passed. The same substitution takes place for Xb using ClipXb when appropriate.

It should be noted that the manner in which clipping is applied by the circuitry of this invention is adapted to conserve clock cycles. For example, since the default condition is a comparison of the clip window X values to the Xa and Xb values, this will usually occur during a cycle in which no other comparisons are being made so that no time is lost to the comparison. For example, in FIG. 4(*a*) nothing is happening during the clock time in which the second pixel from the left on the lowest scan line for line segment A occurs; consequently, a clip window check at this time causes no delay to the circuitry.

Although the present invention has been described in terms of a preferred embodiment, it will be appreciated that various modifications and alterations might be made by those skilled in the art without departing from the spirit and scope of the invention. The invention should therefore be measured in terms of the claims which follow.

We claim:

1. A sorting circuit for a graphics output system comprising means for presenting information regarding the position of a pixel of a first line segment on a particular scan line, means for presenting information regarding the position of a pixel of a second line segment on the same particular scan line, means for selecting from a scan line one pixel from each of the first and second line segments, means for comparing the positions of selected pixels to determine which pixel is further to one extreme on the scan line than the other, and means for comparing a pixel found to have an extreme position with a pixel found in an earlier comparison to have an extreme position to determine which pixel has the more extreme position.

2. A sorting circuit for a graphics output system as claimed in claim 1 further comprising means for disabling a comparison of pixels until a pixel lies within a selected window.

3. A sorting circuit for a graphics output system as claimed in claim 1 further comprising means for substituting a clip window value for a pixel from a line segment.

4. A sorting circuit for a graphics output system as claimed in claim 1 further comprising means for selecting the order in which pixels are selected from scan lines.

5. A sorting circuit for a graphics output system as claimed in claim 4 in which the order depends on the slope of each of the line segments.

6. A sorting circuit for a graphics output system as claimed in claim 4 in which the means for selecting the order in which pixels are selected from scan lines further comprises means for determining when pixels from a next scan line are to be compared.

7. A sorting circuit for a graphics output system as claimed in claim 1 further comprising means for selecting the order in which pixels are selected from any individual scan line.

8. A sorting circuit for a graphics output system as claimed in claim 7 in which the order depends on the slope of each of the line segments.

9. In a computer graphics system in which information defining graphic images to be presented on an output display is available on a scan line basis for a pair of line segments subtending a portion of an image to be presented, the information including the slope of each line segment and the X positions of both line segments on each scan line, each scan line having a first end and a second end, a circuit comprising:

- two comparator subportions, each of the comparator subportions adapted to process information regarding one of said line segments subtending a portion of the image to be presented;
- means for receiving first signals representing first X positions of both said line segments to be processed for one scan line;
- means for comparing said first signals to determine the relative positions to each other of said first X positions on the scan line;
- means for selecting the X positions of the first end of the scan line based on the determination of said relative positions of said first X positions and the slope of each line segment;
- means for receiving second signals representing second X positions of both line segments to be processed for the same scan line;
- means for comparing said second signals to determine the relative positions to each other of said second X positions on the scan line;
- means for selecting the X position of the second end of the scan line based on the determination of said relative positions of said second X positions and the slope of each line segment;
- means for receiving signals indicative of the X positions of a clip window in which the portion of the image is to appear; and
- means for comparing said signals indicative of the X positions of a clip window to said first signals and said second signals.

10. In a computer graphics system as claimed in claim 9, the means for receiving said first signals and said second signals comprising multiplexor circuitry.

11. In a computer graphics system as claimed in claim 9, the means for receiving said first signals and said second signals further comprising means for receiving signals representing clip window edges.

12. In a computer graphics system as claimed in claim 11, the means for receiving said first signals and said second signals comprising multiplexor circuitry.

13. In a computer graphics system as claimed in claim 9, each of the comparator subportions further comprising means for substituting said signals indicative of the X positions of a clip window for said first signals and said second signals.

14. In a computer graphics system as claimed in claim 9, each of the comparator subportions further comprising means for selecting the order in which said first signals and said second signals are selected from scan lines.

15. In a computer graphics system as claimed in claim 14, the order selected by the means for selecting the order in which said first signals and said second signals are selected from scan lines depends on the slope of each of the line segments.

16. In a computer graphics system as claimed in claim 14 the means for selecting the order in which said first signals and said second signals are selected from scan lines further comprises means for determining when first signals and second signals from a next scan line are to be compared.

17. In a computer graphics system in which information defining graphic images to be presented on an output display is available on a scan line basis for a pair of line segments subtending a portion of an image to be presented, the information including the slope of each line segment and the X positions of both line segments on each scan line, each scan line having a first end and a second end, a circuit comprising:

- two comparator subportions, each of the comparator subportions adapted to process information regarding one of said line segments subtending a portion of the image to be presented;
- means for receiving first signals representing first X positions of both of said line segments to be processed for one scan line;
- means for comparing said first signals to determine the relative positions to each other of said first X positions on the scan line;
- first storage means for storing each of said first signals based on said relative positions of said first X positions and the slope of each line segment;
- means for receiving second signals representing second X positions of both of the line segments to be processed for the same scan line;
- means for comparing said second signals to determine the relative positions to each other of said second X positions on the scan line;
- second storage means for storing each of said second signals based on the determination of said relative positions of said second X positions and the slope of each line segment;

means for comparing said second signals and the stored one of said first signals to select an X position for said first end of said scan line;

means for comparing said first signals and the stored one of said second signals to select an X position for said second end of said scan line;

means for receiving signals indicative of the X positions of a clip window in which the portion of the image is to appear; and means for comparing said signals indicative of the X positions of a clip window to said first signals and said second signals.

18. In a computer graphics system as claimed in claim 17, the means for receiving said first signals and said second signals comprising multiplexor circuitry.

19. In a computer graphics system as claimed in claim 17, the means for receiving said first signals and said second signals further comprising means for receiving signals representing clip window edges.

20. In a computer graphics system as claimed in claim 19, the means for receiving said first signals and said second signals comprising multiplexor circuitry.

21. In a computer graphics system as claimed in claim 17, each of the comparator subportions further comprising means for substituting said signals indicative of the X positions of a clip window for said first signals and said second signals.

22. In a computer graphics system as claimed in claim 17, each of the comparator subportions further comprising means for selecting the order in which said first signals and said second signals are selected from scan lines.

23. In a computer graphics system as claimed in claim 22, the order selected by the means for selecting the order in which said first signals and said second signals are selected from scan lines depends on the slope of each of the line segments.

24. In a computer graphics system as claimed in claim 22, the means for selecting the order in which said first signals and said second signals are selected from scan lines further comprises means for determining when first signals and second signals from a next scan line are to be compared.

* * * * *